US009600593B2

(12) United States Patent
Nakamura

(10) Patent No.: US 9,600,593 B2
(45) Date of Patent: Mar. 21, 2017

(54) COMMUNICATION SYSTEM AND COMPUTER READABLE MEDIUM USED THEREIN

(75) Inventor: Tomoki Nakamura, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 806 days.

(21) Appl. No.: 12/570,437

(22) Filed: Sep. 30, 2009

(65) Prior Publication Data
US 2010/0082797 A1 Apr. 1, 2010

(30) Foreign Application Priority Data

Sep. 30, 2008 (JP) .................. 2008-253792

(51) Int. Cl.
G06F 15/173 (2006.01)
G06F 15/16 (2006.01)
G06F 17/30 (2006.01)
H04L 29/08 (2006.01)

(52) U.S. Cl.
CPC .......... G06F 17/3089 (2013.01); H04L 67/02 (2013.01); H04L 67/26 (2013.01)

(58) Field of Classification Search
CPC .............................. H04L 67/26; H04L 67/02
USPC ................................................. 709/217–219
See application file for complete search history.

(56) References Cited

U.S. PATENT DOCUMENTS 7,620,697 B1 * 11/2009 Davies .......................... 709/217
2004/0252985 A1   12/2004 Nonaka et al.
2005/0225534 A1 * 10/2005 Chang .................. G06F 9/4443
                                                    345/163
2006/0230427 A1 * 10/2006 Kunkel et al. ................ 725/133
2006/0287989 A1 * 12/2006 Glance .............................. 707/3
2007/0033006 A1 *  2/2007 Narahara et al. ................ 704/9

(Continued)

FOREIGN PATENT DOCUMENTS

JP    2002-318745 A    10/2002
JP    2004-355444 A    12/2004

(Continued)

OTHER PUBLICATIONS

Japan Patent Office; Notice of Reasons for Rejection in Japanese Patent Application No. 2008-253792 (counterpart to the above-captioned US Patent Applcation) mailed on Aug. 3, 2010.

(Continued)

Primary Examiner — Minh-Chau Nguyen
(74) Attorney, Agent, or Firm — Baker Botts L.L.P.

(57) ABSTRACT

A communication system includes an information processing apparatus and a communication apparatus. The information processing apparatus comprises a controller configured to acquire a file that indicates feed location information and a title of a feed to be acquired in accordance with the feed location information. The controller controls the display to display at least one of the feed location information described in the file and the title described in the file, and to display at least one of the feed location information registered in a device management unit and the title registered in the device management unit. Moreover the controller registers, into the device management unit, feed location information or feed location information corresponding to a title displayed on the first portion of the display, which is specified by the user.

8 Claims, 13 Drawing Sheets

(56) References Cited

U.S. PATENT DOCUMENTS

| | | | |
|---|---|---|---|
| 2007/0081550 A1* | 4/2007 | Moore | 370/462 |
| 2007/0136696 A1* | 6/2007 | Matthews | G06F 17/30855 715/854 |
| 2007/0139698 A1 | 6/2007 | Sato | |
| 2007/0199076 A1* | 8/2007 | Rensin et al. | 726/27 |
| 2007/0204308 A1* | 8/2007 | Nicholas et al. | 725/86 |
| 2007/0208759 A1* | 9/2007 | von Koch et al. | 707/100 |
| 2007/0225047 A1* | 9/2007 | Bakos | 455/566 |
| 2008/0034058 A1* | 2/2008 | Korman et al. | 709/217 |
| 2008/0082941 A1* | 4/2008 | Goldberg et al. | 715/810 |
| 2008/0120394 A1* | 5/2008 | Yokoyama et al. | 709/217 |
| 2008/0126476 A1* | 5/2008 | Nicholas | G06Q 10/10 709/203 |
| 2008/0155085 A1 | 6/2008 | Yokoyama et al. | |
| 2008/0165209 A1 | 7/2008 | Kondo et al. | |
| 2010/0083126 A1 | 4/2010 | Inada | |

FOREIGN PATENT DOCUMENTS

| | | |
|---|---|---|
| JP | 2005-056289 A | 3/2005 |
| JP | 2007-156713 A | 6/2007 |
| JP | 2007-216552 A | 8/2007 |
| JP | 2007-299323 A | 11/2007 |
| JP | 2008-067302 A | 3/2008 |
| JP | 2008-097531 A | 4/2008 |
| JP | 2008-146422 A | 6/2008 |
| JP | 2008-165265 A | 7/2008 |
| JP | 2008-165692 A | 7/2008 |

OTHER PUBLICATIONS

Terajima Joho Kikaku Co., "Techniques of Experts for iPod, DS, PSP: What are you listening? No, I'm reading!" DTM Magazine, Jun. 1, 2006, pp. 58-59, vol. 13, No. 6. Japan.

K. Matsuoka, "Super Light Speed!: How to Collect Internet Information," Nikkei Software, Sep. 25, 2008, pp. 65-77, vol. 11, No. 12, Japan.

Ascii Media Works, "Macintosh Start Up Guide: Use of Internet 4, Safari," Mac People, Dec. 1, 2007, pp. 130-133, vol. 13, No. 12, Japan.

* cited by examiner

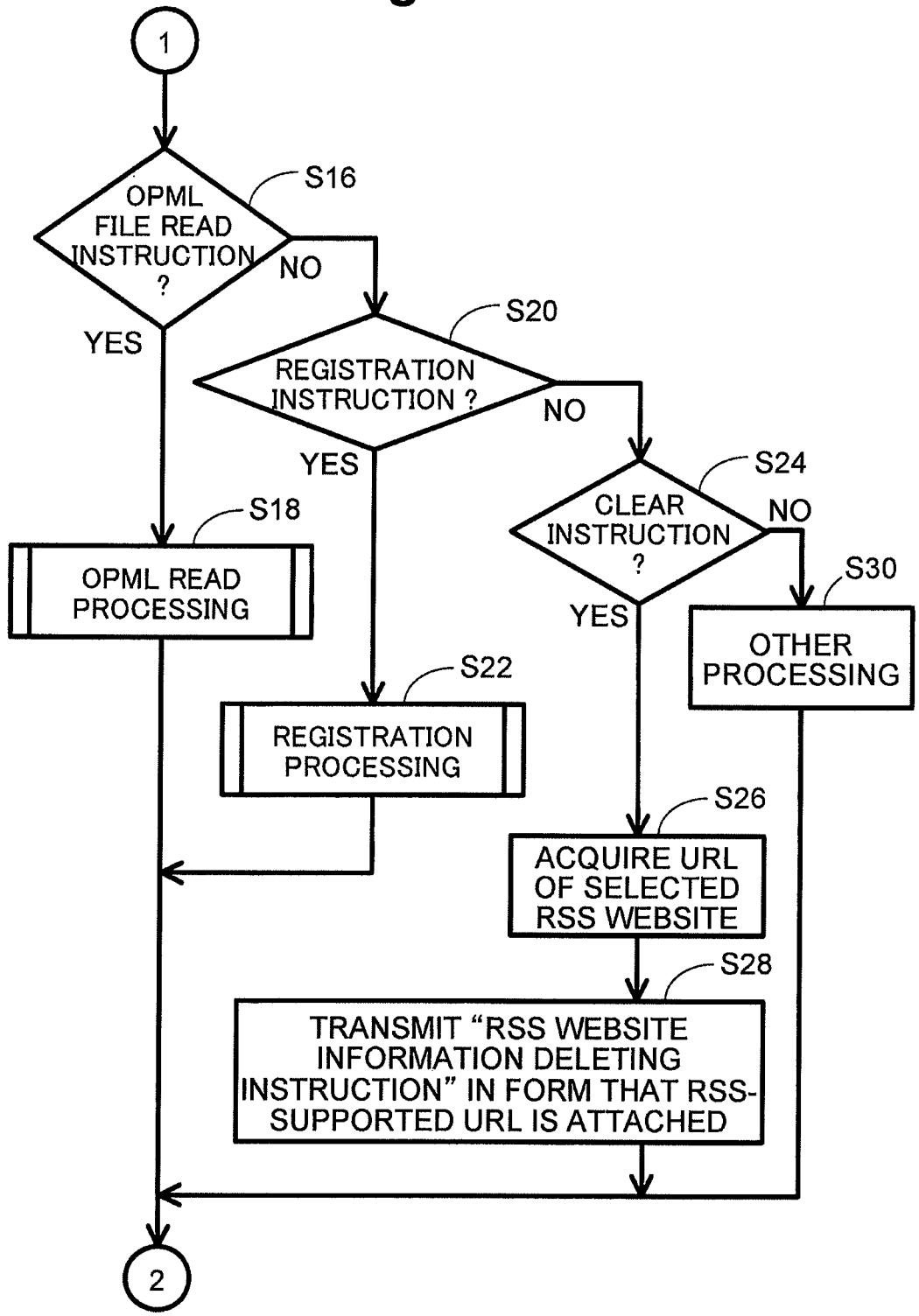

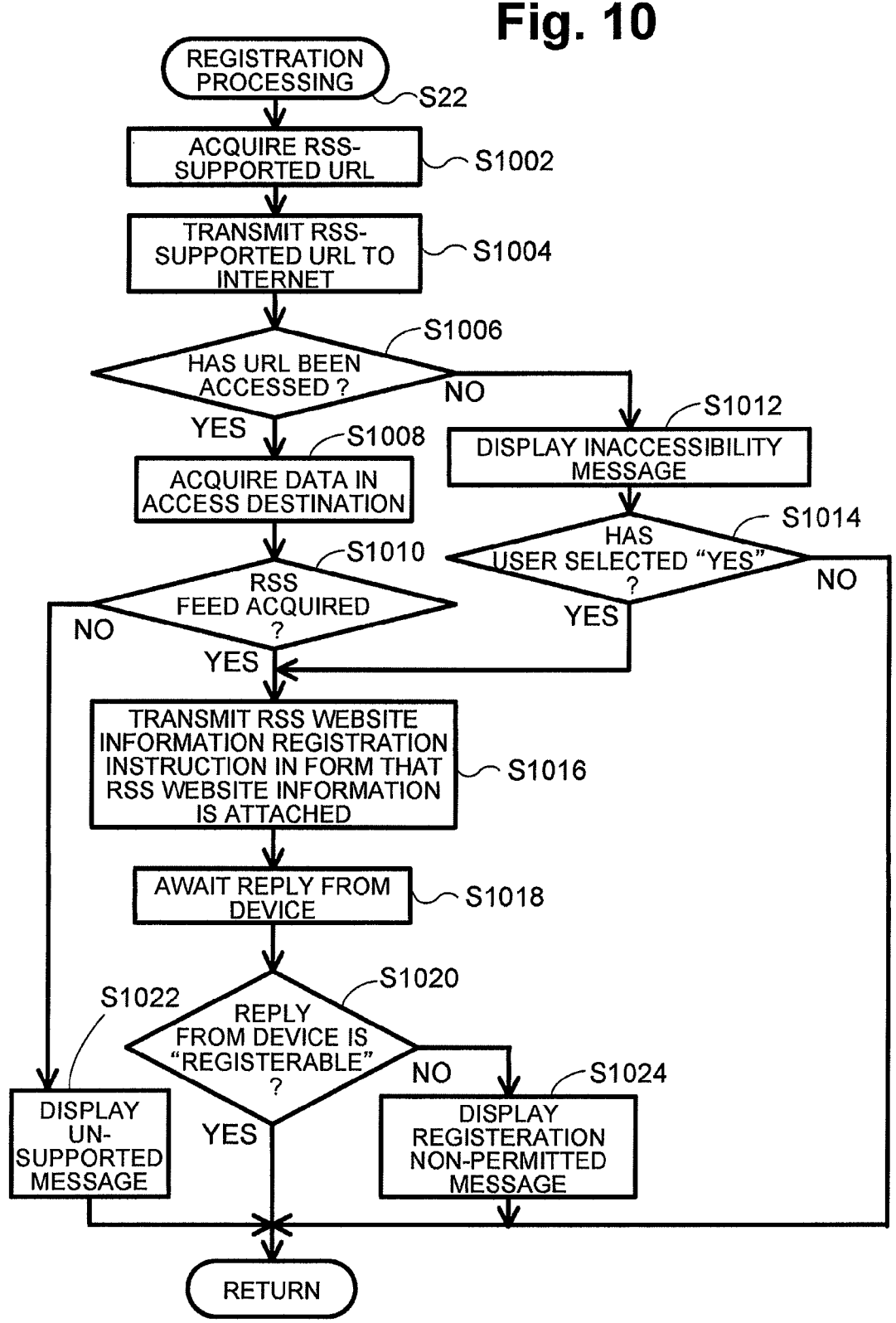

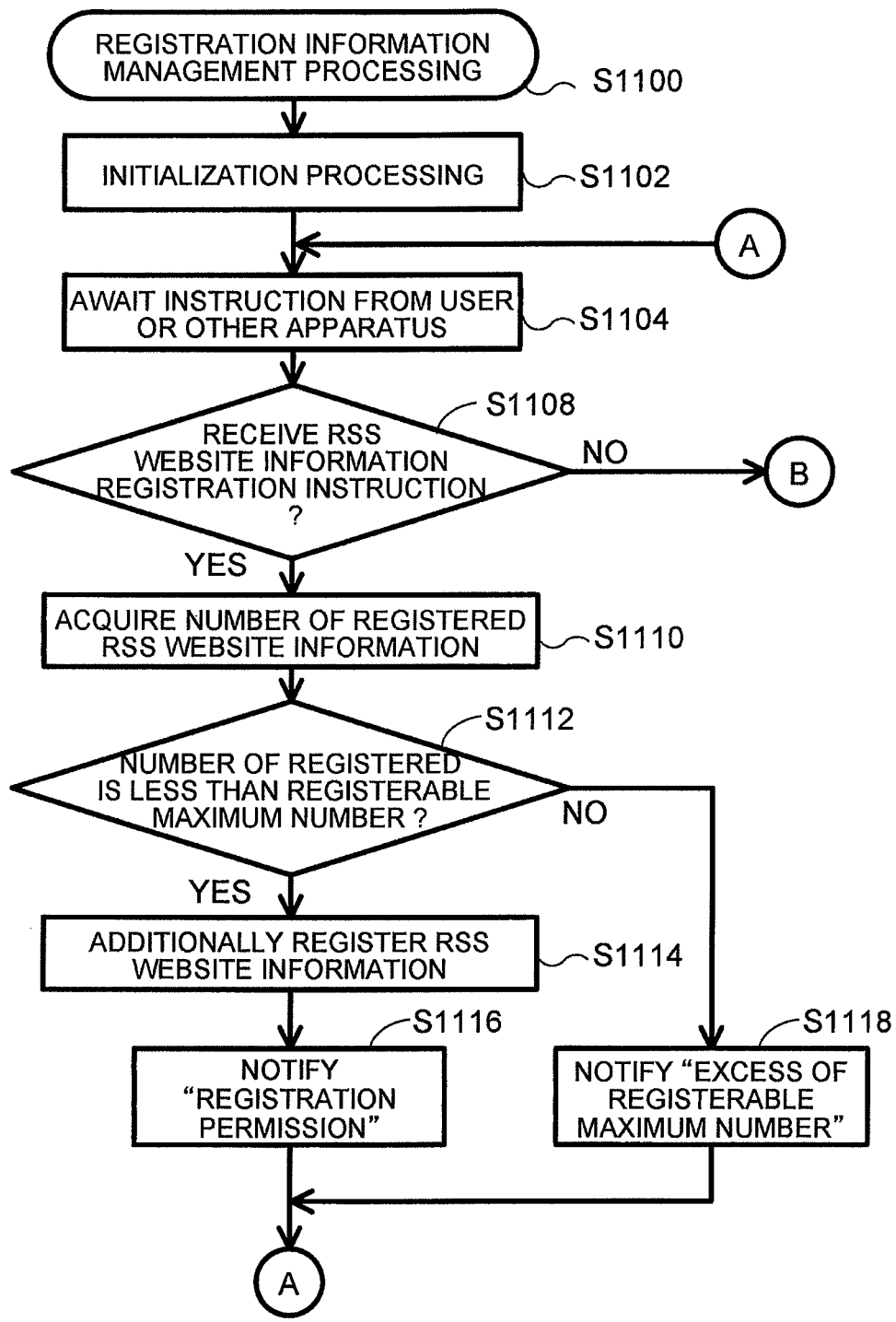

COMMUNICATION SYSTEM AND COMPUTER READABLE MEDIUM USED THEREIN

CROSS REFERENCE TO RELATED APPLICATION

This application claims priority to and the benefit of Japanese Patent Application No. 2008-253792, filed Sep. 30, 2008, the entire subject matter and disclosure of which is incorporated herein by reference.

BACKGROUND

1. Technical Field

The present invention relates to a communication system which treats a feed.

2. Description of the Related Art

In recent years, an increasing number of websites distribute the headers of the articles in the individual website, in the form called a feed. When a user acquires the URL (Uniform Resource Locator) of a feed distributor from a desired website and then registers the URL into a feed reader, the user can browse the feed of the desired website and acquire update information.

When feed distributor URLs and the like registered in a particular feed reader are to be collectively transferred to another feed reader, the use of an OPML (Outline Processor Markup Language) file may be convenient. Specifically, feed distributor URLs and feed titles registered in a feed reader are written into an OPML file so that a list is generated. Then, the OPML file is read into another feed reader. As a result, registered information is collectively transferred between the feed readers.

Here, in some cases, a feed reader is installed in a communication apparatus other than a PC, in such as a copy machine, a printer, a facsimile machine, or a combined machine so that feed browsing is achieved through the communication apparatus. Such a communication apparatus other than a PC is not provided with a keyboard in many cases. Thus, inputting of information such as URLs is difficult in comparison with the case of a PC. Accordingly, when information registered in the feed reader on the PC side can be transferred to the feed reader on the communication apparatus side by using the OPML file described above, user workload may be reduced.

SUMMARY

Nevertheless, in the prior art transfer method using an OPML file, the entire information is transferred collectively. That is, a problem arises that the user cannot by oneself select information to be transferred. Specifically, even information not desired by the user is transferred. Further, when the number of URLs described in the OPML file exceeds the maximum number registerable in the feed reader serving as the transfer destination, URLs that exceed the maximum number are omitted automatically. Thus, the user need check which URLs have been omitted, and then need retransfer operation when any desired URL is omitted.

In particular, in a configuration that the headers of latest articles or the like acquired from a feed are displayed sequentially in a scrolling manner on a small screen provided in a combined machine or the like, merely a limited amount of information can be displayed in comparison with the case of a PC. Thus, the maximum number of registerable feed distributor URLs is limited in some cases. Accordingly, when even undesired URLs are also registered under such a condition of limited maximum number of registerable entries, URLs truly desired by the user cannot be registered in some cases. This situation is inconvenient.

A need has arisen to provide a communication system in which feed location information to be transferred to a device management unit can be selected, by a user oneself, in a reduced time. The communication system comprising an information processing apparatus and a communication apparatus. The information processing apparatus comprising a communicating unit which communicates with a network, a display comprising a first portion and a second portion, an input device configured to be inputted an instruction by a user, and a controller. The controller is configured to transmit, to the network, feed location information registered in advance and then acquire a feed replied from the network. The controller is further configured to transmit, to the network, location information of contents contained in the acquired feed and then acquire the contents replied from the network. The controller is still further configured to acquire a file that indicates feed location information and a title of a feed to be acquired in accordance with the feed location information. The communication apparatus comprises a device management unit which is connected to the information processing apparatus via the communicating unit. The device management unit stores registration of feed location information and a title of a feed to be acquired in accordance with the feed location information. The device management unit is configured to transmit, to the network, feed location information registered in advance in the device management unit and then acquire a feed replied from the network. Wherein the controller is further configured to control the display to display, on the first portion of the display, at least one of the feed location information described in the file and the title described in the file, and still further configured to display, on the second portion of the display, at least one of the feed location information registered in the device management unit and the title registered in the device management unit. Moreover the controller is configured to register, into the device management unit, feed location information displayed on the first portion of the display or feed location information corresponding to a title displayed on the first portion of the display, which is specified by the user via the input device.

Here, the term "feed location information" collectively indicates any kind of information that allows the location of a feed to be specified. Examples of this include an RSS-supported URL (Uniform Resource Locator) corresponding to a feed of RSS format and an Atom-compatible URL corresponding to a feed of Atom format. Further, the term "title of a feed" indicates a character string that expresses contents by using a number smaller of characters than the entire character string of the contents. Further, the term "communication apparatus" indicates an apparatus that is connectable to a network and performs communication with another apparatus on the network. Examples of the communication apparatus include a combined machine, a copy machine, a facsimile apparatus, and a printer.

BRIEF DESCRIPTION OF THE DRAWINGS

For a more complete understanding of the present invention, the needs satisfied thereby, and the features and advantages thereof, reference now is made to the following descriptions taken in connection with the accompanying drawings.

FIGS. 4A and 4B form a flow chart showing distribution information management processing executed by a PC.

FIG. 10 is a flow chart showing registration processing executed by a combined machine.

FIGS. 11A and 11B form a flow chart showing registration information management processing executed by a combined machine.

DESCRIPTION OF THE PREFERRED EMBODIMENTS

Embodiments of the present invention and their features and advantages may be understood by referring to FIGS. 1-11A and 11B, like numerals being used for like corresponding parts in the various drawings.

Figure 1:
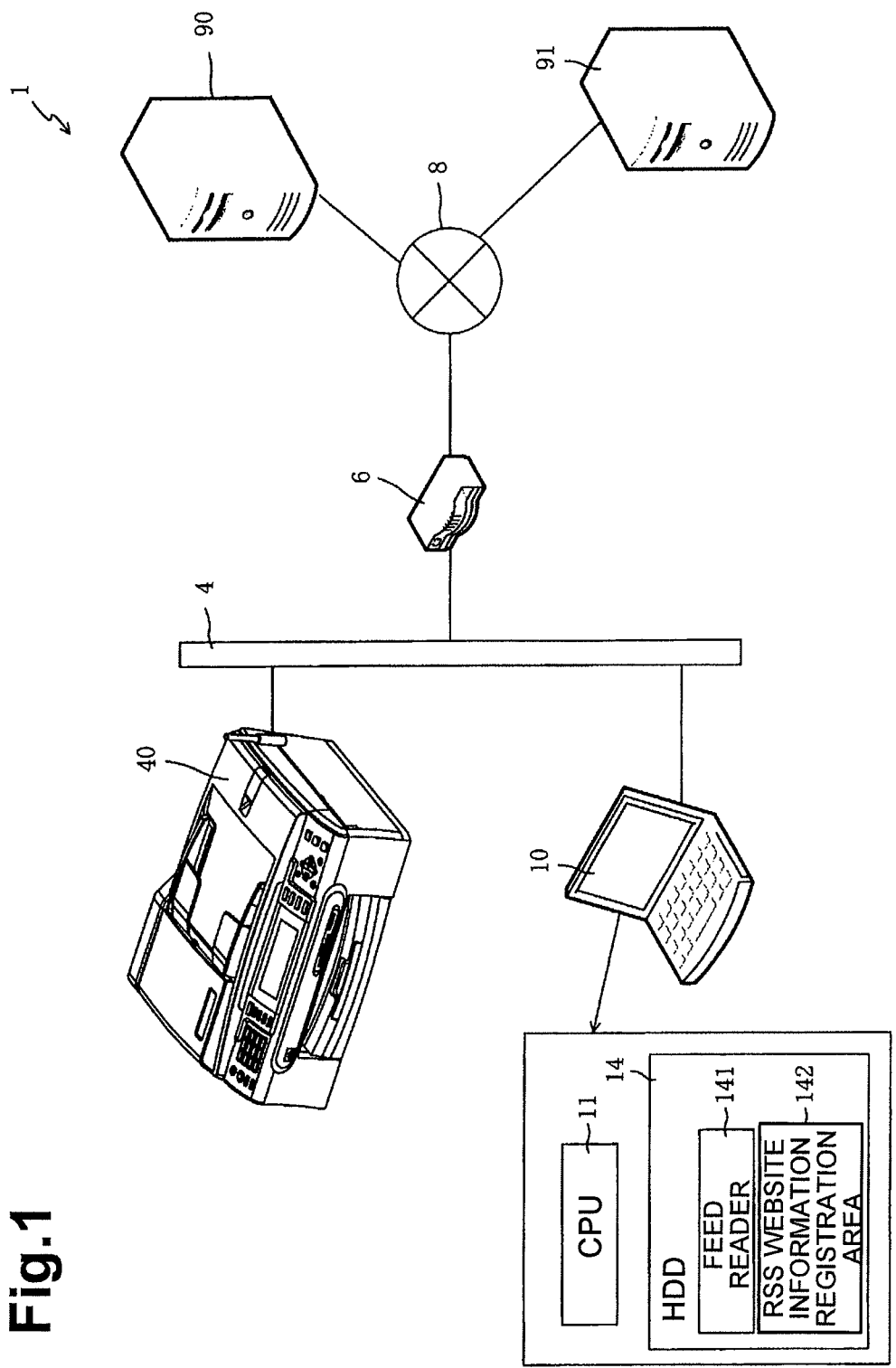
FIG. 1 is a schematic diagram showing outlines of a PC in which a feed reader according to an embodiment of the invention is installed and a communication system including the PC.

A preferred embodiment of the invention is described below with reference to the accompanying drawings. FIG. 1 is a schematic diagram showing outlines of a personal computer 10 (referred to as a PC 10, hereinafter) provided with a feed reader 141 serving as an embodiment of a location information management program according to the invention and a communication system 1 including the PC 10. As shown in FIG. 1, the communication system 1 includes the PC 10, a combined machine 40, and servers 90 and 91. The PC 10 and the combined machine 40 are connected to a LAN line 4. The LAN line 4 is connected to the Internet 8 through a router 6. Further, the servers 90 and 91 are also connected to the Internet 8. Here, the number of PCs, servers, and combined machines included in the communication system 1 may be arbitrary.

Each of the servers 90 and 91 is used for opening to the public a website on the Internet 8, and distributes a feed to the website. Here, the term "feed" indicates data generated by processing the update information of a website into a predetermined format. Further, the feed described here contains at least a contents URL used for accessing the contents on the website and the title of the contents. Further, the feed may contain summary information that permits recognition of the outlines of the contents themselves or the headers of the articles or the like contained in the contents. Further, the term "contents" indicates information collectively manageable in a website. Each contents set is assigned with a URL used for accessing the contents. Thus, each contents set may be recognized as information corresponding to a URL in a website.

A feed reader is installed in each of the PC 10 and the combined machine 40. Then, an RSS-supported URL (an example of feed location information described in the claims) registered in advance is transmitted to the Internet 8. Then, a feed corresponding to the RSS-supported URL transmitted from the Internet 8 is acquired. Here, plural kinds of formats are employable for the feed, like the RSS format and the Atom format. However, the present embodiment is described for a case that the feed reader is a program for acquiring and analyzing a feed of RSS format.

The PC 10 according to the present embodiment can additionally register, into the combined machine 40, RSS site information specified by a user through the PC 10. Details of this are described later.

Figure 2:
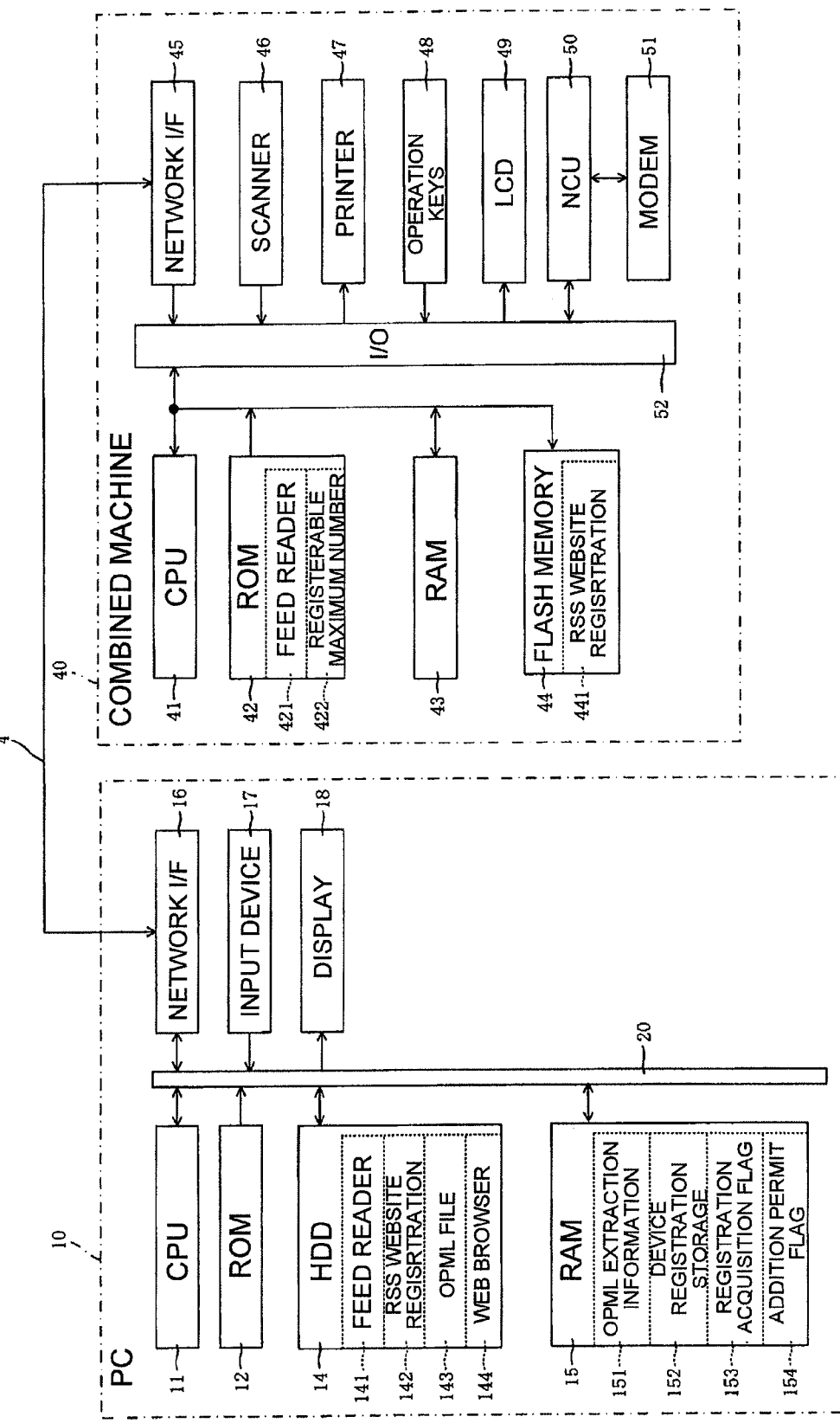
FIG. 2 is a block diagram schematically showing an electrical configuration of a PC and a combined machine.

FIG. 2 is a block diagram schematically showing the electrical configuration of the PC 10 and the combined machine 40. Here, the schematic configuration of the PC 10 shown in the schematic diagram of FIG. 1 has been illustrated by extracting only elements necessary for the description of FIG. 1 from the electrical configuration of the PC 10 shown in FIG. 2.

As shown in FIG. 2, the PC 10 has a CPU 11, a ROM 12, a hard disk drive 14 (referred to as an HDD 14, hereinafter), a RAM 15, a network interface 16 (referred to as a network I/F 16, hereinafter), an input device 17, and a display device 18. These units are mutually connected through a bus line 20.

The CPU 11 is a central processing unit for controlling the entirety of the PC 10, and executes the processing shown in the flow chart of FIGS. 4 to 10 in accordance with the feed reader 141. The ROM 12 is a memory for storing programs and the like used for controlling the operation of the PC 10.

The HDD 14 is a rewritable nonvolatile memory, and stores the feed reader 141. Further, when the feed reader 141 is installed into the PC 10, an RSS site information registration area 142 and an OPML file storage area 143 are allocated in the HDD 14.

The RSS site information registration area 142 is an area where RSS site information consisting of an RSS-supported URL and a feed title is to be registered. When a URL to be registered into the RSS site information registration area 142 is inputted by user operation, the feed reader 141 acquires from the Internet 8 a feed title corresponding to the inputted URL, then generates RSS site information on the basis of the URL and the feed title, and then registers the information into the RSS site information registration area 142.

Then, periodically or in response to an instruction from the user, in accordance with the feed reader 141, the CPU 11 acquires a feed corresponding to the RSS-supported URL registered in the RSS site information registration area 142, and then executes the processing of analysis and display.

The OPML file storage area 143 is an area for storing the OPML file. The OPML file describes a URL and information associated with the URL. When the user issues to the feed reader 141 an instruction of exporting RSS site information, the PC 10 generates an OPML file that describes the URL registered in the RSS site information registration area 142 managed by the feed reader 141 and information associated with the URL. When the OPML file is used, the RSS site information registered in the RSS site information registration area 142 can be additionally registered into a registration unit managed by another feed reader. Details of this are described later.

The HDD 14 further stores a web browser 144. In accordance with the web browser 144, the CPU 11 transmits the contents URL to the Internet 8, then downloads the contents from the website, and then displays the contents. In particular, in the present embodiment, after a feed is acquired by the feed reader 141 and then the contents title contained in the feed is displayed on the display device 18, when the user clicks the title, the PC 10 starts up the web browser 144, then downloads the contents corresponding to the contents title from the Internet 8, and then executes the processing of display onto the display device 18. Further, as described above, the OPML file describes a URL and information associated with the URL. Thus, when the user issues to the web browser 144 an instruction of exporting a URL, the web browser 144 generates an OPML file that describes the URL managed by the own program.

Here, the web browser 144 may be provided with the function of a feed reader. That is, the web browser 144 may transmit the RSS-supported URL to the Internet 8, and then acquire and analyze the feed. In a case that contents URLs each corresponding to contents such as a document file and a web page and RSS-supported URLs each corresponding to a feed are registered in a mixed manner in the web browser 144, when the user issues an instruction of exporting a URL, the web browser 144 generates an OPML file that describes both URLs.

That is, in the PC 10, when the user visually recognizes a contents title contained in a feed and desires to browse the details, it is sufficient that the user clicks the contents title displayed on the screen. This simple operation allows the user to browse the contents corresponding to the feed.

The RAM 15 is a random-access memory used for temporarily storing data and the like necessary in the processing in the CPU 11. The RAM 15 has an OPML extraction information storage area 151, a device registration information storage area 152, a device registration information acquisition flag 153, and an addition permit flag 154.

The OPML extraction information storage area 151 is an area for storing the RSS site information corresponding to the feed solely extracted from the information described in the OPML file. Details of this are described later with reference to FIG. 9. However, the OPML file can describe even a non-RSS-supported URL in addition to the RSS site information. Thus, the PC 10 according to the present embodiment extracts the RSS site information alone from the OPML file, and then writes the information into the OPML extraction information storage area 151. Details of this are described later with reference to FIGS. 8 and 9.

The device registration information storage area 152 is an area for storing an RSS site information list already registered in an external device. When a destination of additional registration of RSS site information is specified by the user, the feed reader 141 acquires from the specified external device an RSS site information list registered in the device, and then stores the list into the device registration information storage area 152.

The device registration information acquisition flag 153 is a flag into which "1" is stored when an RSS site information list registered in a specified external device and the maximum number of registerable RSS site information pieces has successfully been acquired from the specified external device, and into which "0" is stored when the data acquisition has been failed. The addition permit flag 154 is a flag into which "1" is stored when additional registration of RSS site information into a specified external device is permitted, and into which "0" is stored when not permitted.

The network I/F 16 connects the PC 10 to the LAN line 4 and the Internet 8. The input device 17 is used by the user for inputting an instruction, and is constructed from a keyboard, a mouse, and the like.

The display device 18 is constructed from a CRT display, a liquid crystal display, or the like. The display device 18 displays various kinds of screens such as an RSS list setting screen 60 (see FIG. 3) described later, and further displays a feed analysis result obtained by the feed reader 141 and contents downloaded by the browser 144.

The combined machine 40 includes a CPU 41, a ROM 42, a RAM 43, a flash memory 44, a network interface (network I/F) 45, a scanner 46, a printer operation keys 48, an LCD 49, an NCU 50, a modem 51, and an input/output port 52.

Figure 11B:
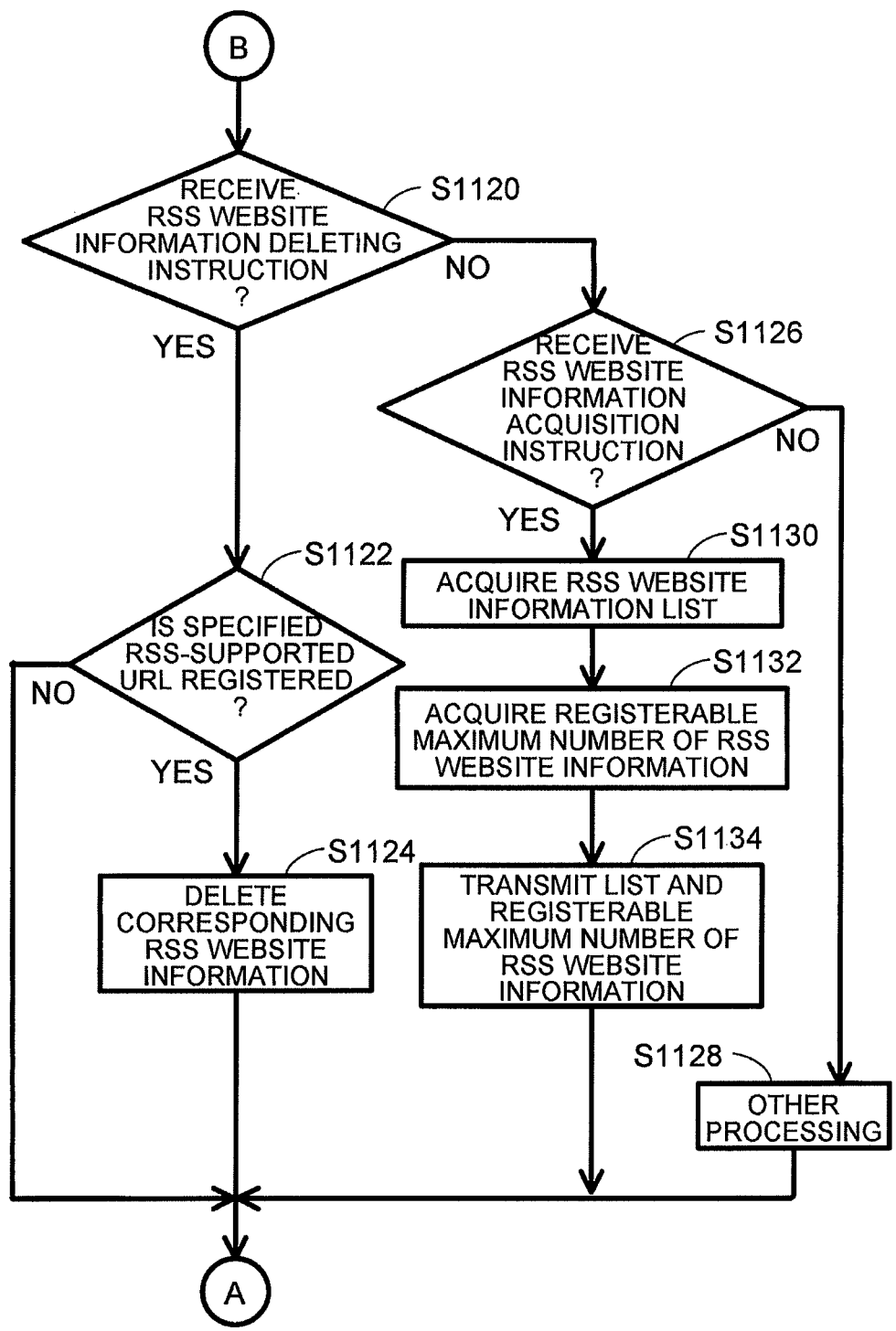

The CPU 41 is a central processing unit for controlling the entirety of the combined machine 40, and executes various programs like a program for executing the processing shown in the flow chart of FIGS. 11A and 11B. The ROM 42 stores various programs for controlling various kinds of operation of the combined machine 40, and further stores a feed reader 421. In accordance with the feed reader 421, the combined machine 40 acquires and analyzes a feed, and further executes registration information management processing described later with reference to FIGS. 11A and 11B (S1100).

Further, the ROM 42 has a maximum number storage area 422 for storing the "maximum number of registerable RSS site information pieces" corresponding to the upper limit of the number of RSS site information pieces that can be registered in the combined machine 40. The RAM 43 is used as a storage area or a working area for temporarily storing various kinds of data used when the CPU 41 executes the above-mentioned programs.

The flash memory 44 has a device-side RSS site information registration area 441. When the user inputs an RSS-supported URL by using the operation keys 48, the combined machine 40 acquires a feed title corresponding to the inputted RSS-supported URL from the Internet 8, then generates RSS site information consisting of the RSS-supported URL and the feed title, and then registers the information into the device-side RSS site information registration area 441. Further, the combined machine 40 transmits to the Internet 8 the RSS-supported URL registered in the device-side RSS site information registration area 441, and then acquires a feed corresponding to the RSS-supported URL.

The network I/F 45 connects the combined machine 40 to the LAN line 4 and the Internet 8. The combined machine 40 is connected to the PC 10 and the Internet 8 in a communication available manner through the network I/F 45 and the LAN line 4.

Here, the CPU 41 can control units of the scanner 46, the printer 47, the operation keys 48, the LCD 49, the NCU 50, and the modem 51 through the input/output port 52. These units connected to the input/output port 52 have publicly known construction, and hence detailed description is omitted. By using this configuration, the combined machine 40 implements a copy function, a print function, and a facsimile function.

Here, in contrast to the case of the PC 10, the combined machine 40 needs not have the web browser 144 for displaying the contents themselves. The feed analysis result like the headers of articles has a small amount of data. Thus, even when the result is displayed on the LCD 49 of the combined machine 40 or the like, the user can satisfactorily browse the result. Nevertheless, the size and the resolution of the display feasible region are limited. Thus, in contrast, when the contents of a website are displayed after downloaded on the basis of a contents URL contained in a feed, browsing is difficult in many cases.

Figure 3:
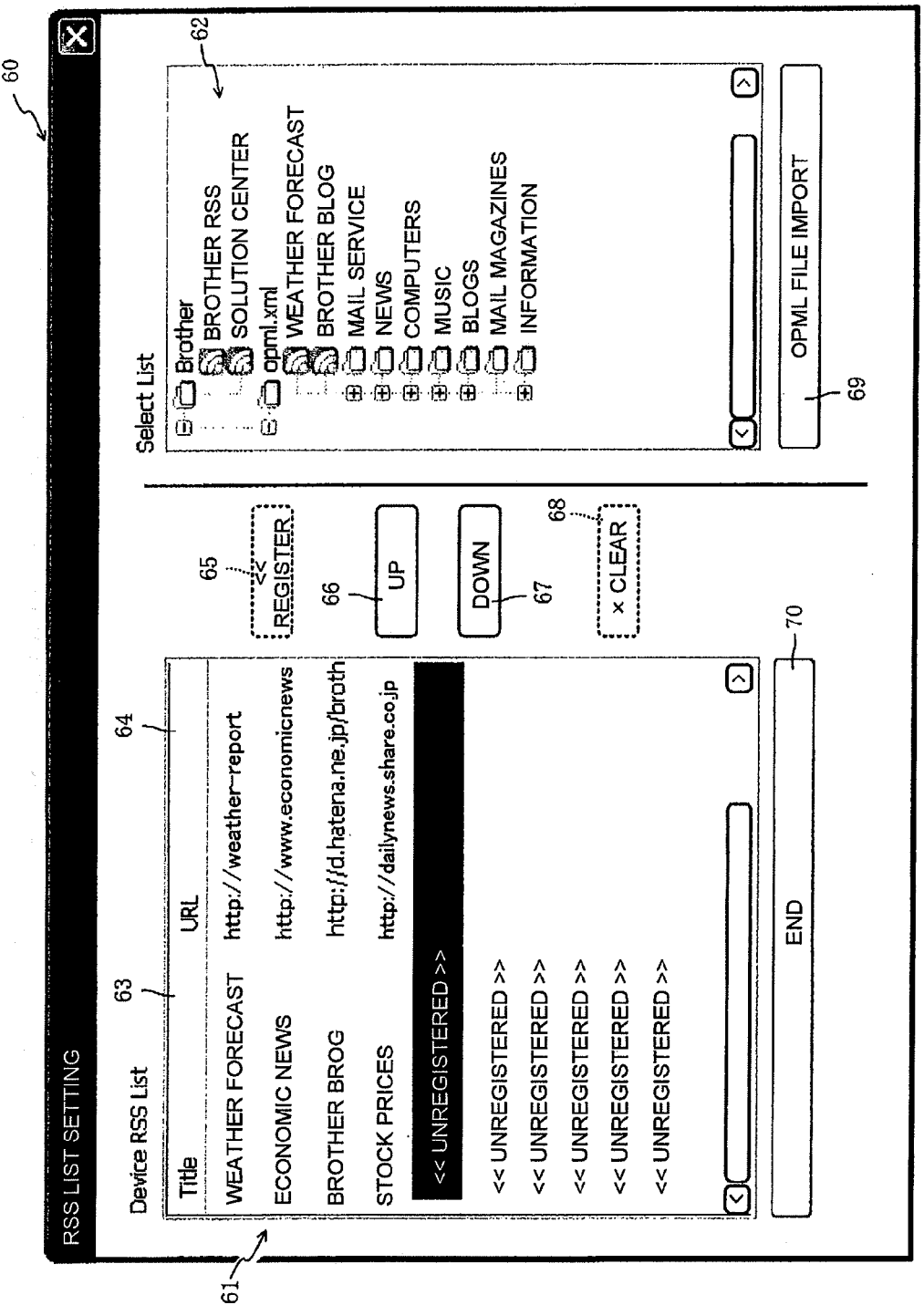
FIG. 3 is a diagram showing an example of an RSS list setting screen displayed on a display device of a PC.

FIG. 3 is a diagram showing an example of the RSS list setting screen 60 displayed on the display device 18 of the PC 10. The RSS list is displayed setting screen 60 when the user issues an instruction of additional registration of the RSS site information into the external device. It is assumed that before the display of the RSS list setting screen 60, the user specifies in advance an OPML file serving as the reference source of the RSS site information and a device serving as the destination of additional registration of the RSS site information. Here, FIG. 3 shows an example that the combined machine 40 is specified as the device of destination of additional registration.

As shown in FIG. 3, the RSS list setting screen 60 displays a device RSS list 61 and a selection list 62, side by side, in parallel arrangement.

The device RSS list 61 shows the RSS site information registered in the device-side RSS site information registration area 441. Each RSS site information piece contains a feed title and an RSS-supported URL. Thus, the device RSS list 61 has a title area 63 for listing the feed titles and a URL area 64 for listing the RSS-supported URLs. Then, each pair of a feed title and an RSS-supported URL constituting one RSS site information piece are displayed in horizontally parallel arrangement. This device RSS list 61 allows the user to visually recognize the RSS site information registered in the combined machine 40.

On the other hand, the selection list 62 shows the feed titles contained in the RSS site information extracted from the OPML file specified by the user. Here, in the OPML file, when the RSS site information is grouped into folders, the selection list 62 may show the folders at first. Then, the feed titles of the RSS site information contained in a folder alone specified by the user may be displayed.

Further, the RSS list setting screen 60 has a registration button 65, an upward move button 66, a downward move button 67, a clear button 68, an OPML reading button 69, and an end button 70. Here, in a state that no feed title is selected in the selection list 62, the registration button 65 is grayed out so that pressing is inhibited. Further, in a state that no RSS site information is selected in the device RSS list 61, the clear button 68 is grayed out so that pressing is inhibited. Here, in FIG. 3, the registration button 65 and the clear button 68 in a grayed-out state are illustrated in dash-dotted lines.

The registration button 65 is used for inputting a registration instruction for RSS site information. When any one of the feed titles displayed in the selection list 62 is selected by the user, its grayed-out state is cancelled and hence pressing of the registration button 65 is permitted. Then, when the registration button 65 is pressed on the screen by using the mouse cursor or the like so that a registration instruction is inputted to the CPU 11, the PC 10 executes the processing of additional registration of the RSS site information containing the selected feed title into the device-side RSS site information registration area 441. Nevertheless, in a case that the device specified as the destination of additional registration has no vacancy for additional registration of the RSS site information, even when any feed title in the selection list 62 is selected, the registration button 65 remains grayed out and hence pressing is inhibited.

The upward move button 66 and the downward move button 67 allow the user to select a position where additionally registered RSS site information is to be displayed in the device RSS list 61.

The clear button 68 is used for inputting a clear instruction for RSS site information. When any one of the RSS site information pieces displayed in the device RSS list 61 is selected by the user, the grayed-out state of the clear button 68 is cancelled and hence pressing is permitted. Then, when the clear button 68 is pressed on the screen by using the mouse cursor or the like so that a clear instruction is inputted to the CPU 11, the PC 10 executes the processing of deleting the selected RSS site information from the device-side RSS site information registration area 441.

The OPML reading button 69 is used for displaying a list (not shown) of the OPML files stored in the PC 10. Then, when the user specifies any one in the displayed list so that a read instruction for the OPML file is inputted, the PC 10 reads the OPML file specified by the user, and then displays the selection list 62 of the feed titles (or the folder names where the RSS site information is stored) described in the OPML file.

The end button 70 is used for inputting an end instruction into the PC 10. When the end button 70 is pressed on the screen, the PC 10 closes the RSS list addition screen 60, and then terminates the processing of additional registration of RSS site information.

As such, according to the RSS list setting screen 60, the user can visually compare the RSS site information registered in the PC 10 with the RSS site information registered in the combined machine 40, and then select RSS site information desired to be transferred to the combined machine 40.

Then, the PC 10 according to the present embodiment executes the processing of additional registration of the RSS site information specified by user operation among the feed titles of the RSS site information displayed in the selection list 62 into the device-side RSS site information registration area 441 of the combined machine 40. Here, in the present embodiment, the term "RSS site information specified by user operation" indicates RSS site information corresponding to a feed title having been selected in the selection list 62 at the time when user operation of pressing the registration button 65 is performed. However, the particular example of the user operation of specifying RSS site information may be changed variously by design.

According to the PC 10 of the present embodiment, RSS site information to be transferred from the OPML file to the device-side RSS site information registration area 441 can easily be selected by the user oneself. Details of this processing are described below with reference to a flow chart.

Figure 4A:
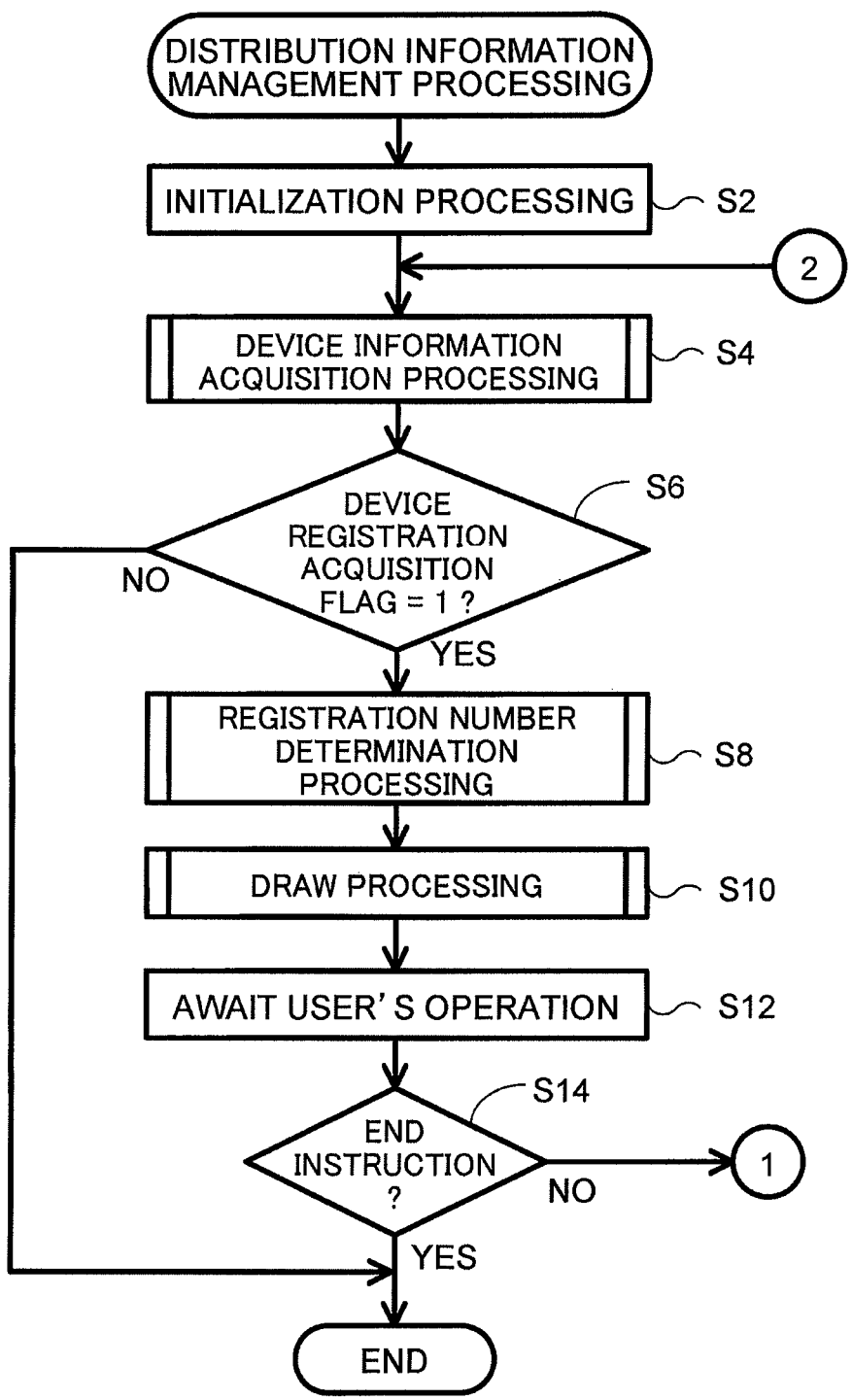

FIGS. 4A and 4B form a flow chart showing distribution information management processing executed by the PC 10. The distribution information management processing is executed when an external device on the LAN line 4 is specified by the user and then additional registration of RSS site information into the external device is instructed by the user. The distribution information management processing is executed in accordance with the feed reader 141. Here, unless mentioned otherwise, the following description is given for a case that the combined machine 40 is specified as the external device of target of additional registration.

First, the storage area used as a temporary storage area or a working area in this processing is initialized (S2). Then, device information acquisition processing is executed in which RSS site information registered in the external device specified by the user is acquired from the device (S4).

Figure 5:
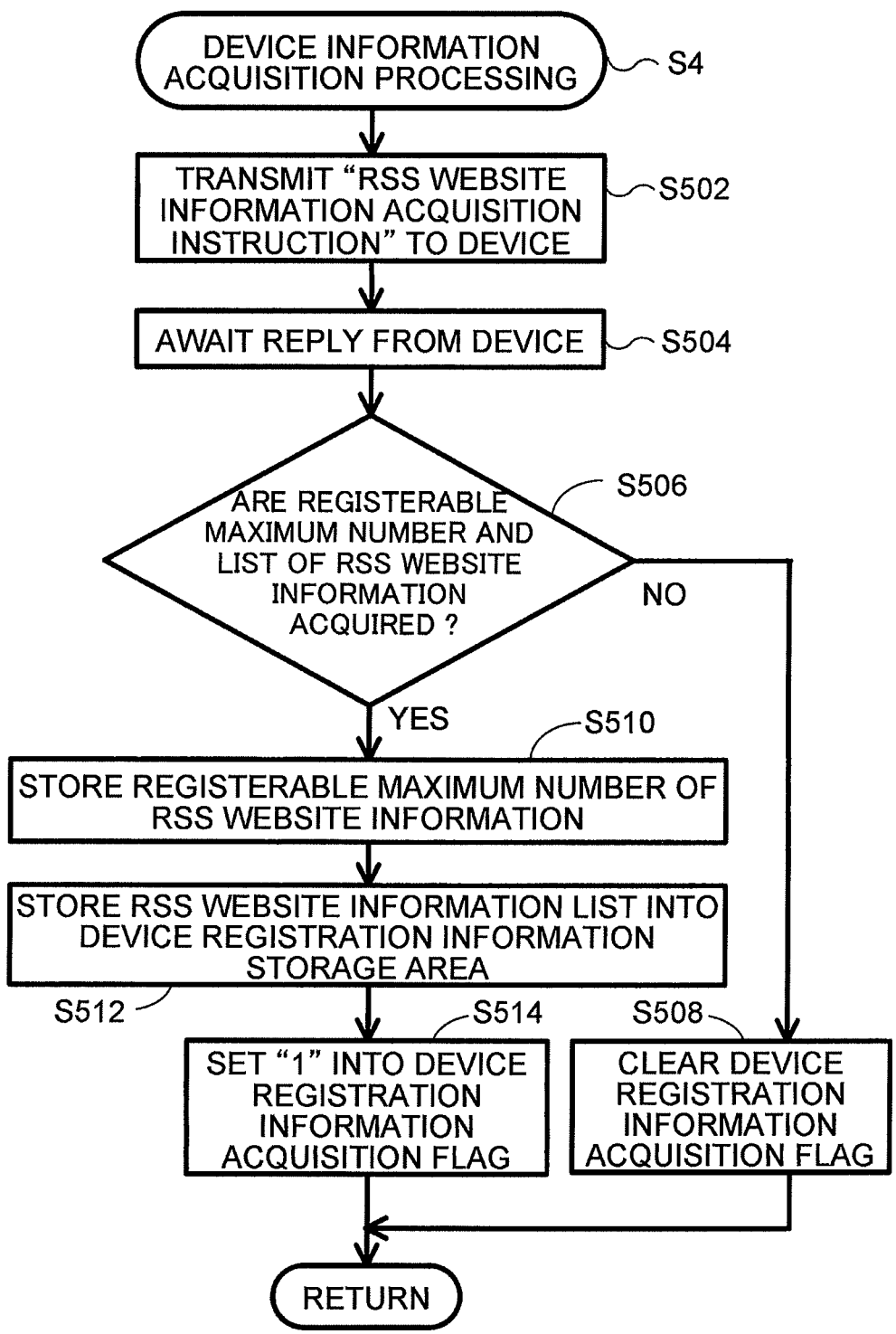
FIG. 5 is a flow chart showing device information acquisition processing executed by a PC.

FIG. 5 is a flow chart showing the device information acquisition processing (S4). In the device information income processing (S4), first, an "RSS site information acquisition instruction" is transmitted to the device (the combined machine 40, in the present embodiment) specified by the user (S502). Then, a reply from the device is awaited (S504). Here, details of the processing in the combined machine 40 are described later with reference to FIGS. 11A and 11B. However, when receiving the above-mentioned instruction, the combined machine 40 replies to the PC 10 the RSS site information list registered in the own machine and the "maximum number of registerable RSS site information pieces".

Then, it is determined whether the maximum number of registerable RSS site information pieces and the RSS site information list have been acquired from the device (S506). When the determination result at S506 is negative (S506: No), "0" is stored into the device registration information acquisition flag 153 (S508). Then, the procedure goes to the processing at S6 shown in FIG. 4A.

In contrast, when the determination result at S506 is positive (S506: Yes), the acquired maximum number of registerable RSS site information pieces is stored into the RAM 15 (see FIG. 2) (S510) and then the RSS site information list is stored into the device registration information storage area 152 (see FIG. 2) (S512). Then, "1" is stored into the device registration information acquisition flag 153 (S514). Then, the procedure goes to the processing at S6 shown in FIG. 4A.

Description is continued with returning to FIG. 4A. Then, it is determined whether the device registration information acquisition flag is "1" (S6). When the determination result at S6 is negative (S6: No), the present processing is terminated. In contrast, when the determination result at S6 is positive (S6: Yes), device-side number-of-registered-entries determination processing is executed in which the number of registered RSS site information pieces in the device is determined (S8). Here, the device-side number-of-registered-entries determination processing (S8) is described later with reference to FIG. 6.

Then, draw processing is executed in which the RSS list setting screen 60 (see FIG. 3) is drawn on the display device 18 (S10). Details of the draw processing (S10) are described later with reference to FIG. 7. After that step, with awaiting operation from the user (S12), it is determined whether an end instruction has been inputted (S14). When the determination result at S14 is positive (S14: Yes), the present processing is terminated.

In contrast, when the determination result at S14 is negative (S14: No), it is determined whether a read instruction for an OPML file is inputted (S16). When the determination result at S16 is positive (S16: Yes), the OPML file is read. Then, OPML read processing is executed in which the feed titles (or the folder names where RSS site information is stored) are displayed in the selection list 62 (see FIG. 3) (S18). Then, the procedure returns to S4. Here, details of the OPML read processing (S18) are described later with reference to FIG. 8.

In contrast, when the determination result at S16 is negative (S16: No), then, it is determined whether a registration instruction has been inputted (S20). When the determination result at S20 is positive (S20: Yes), the processing of additional registration of the RSS site information specified by user operation into the device-side RSS site information registration area 441 (see FIG. 2) is executed (S22). Then, the procedure returns to S4. Here, details of the registration processing (S20) are described later with reference to FIG. 10.

In contrast, when the determination result at S20 is negative (S20: No), then, it is determined whether a clear instruction has been inputted (S24). When the determination result at S24 is positive (S24: Yes), an RSS-supported URL contained in the RSS site information selected in the device RSS list 61 is read and acquired from the device registration information storage area 152 (S26). Then, an "RSS site information deleting instruction" in the form that the RSS-supported URL is attached is transmitted to the combined machine 40 (S28). Then, the procedure returns to S4. Details of this are described later with reference to FIGS. 11A and 11B. However, on receiving the RSS site information deleting instruction, the combined machine 40 deletes the corresponding RSS site information.

In contrast, when the determination result at S24 is negative (S24: No), processing in accordance with other instruction is executed (S30). For example, when operation of pressing a folder name in the selection list 62 is performed, feed titles contained in the folder specified by the folder name are displayed in the selection list 62. After the processing at S30, the procedure returns to S4.

As such, in the distribution information management processing, the RSS list setting screen 60 (see FIG. 3) is drawn in which the RSS site information registered in the specified external device and the RSS site information described in the specified OPML file are displayed in parallel arrangement. Then, in accordance with an instruction inputted by the user, various kinds of processing such as additional registration of RSS site information is executed.

Figure 6:
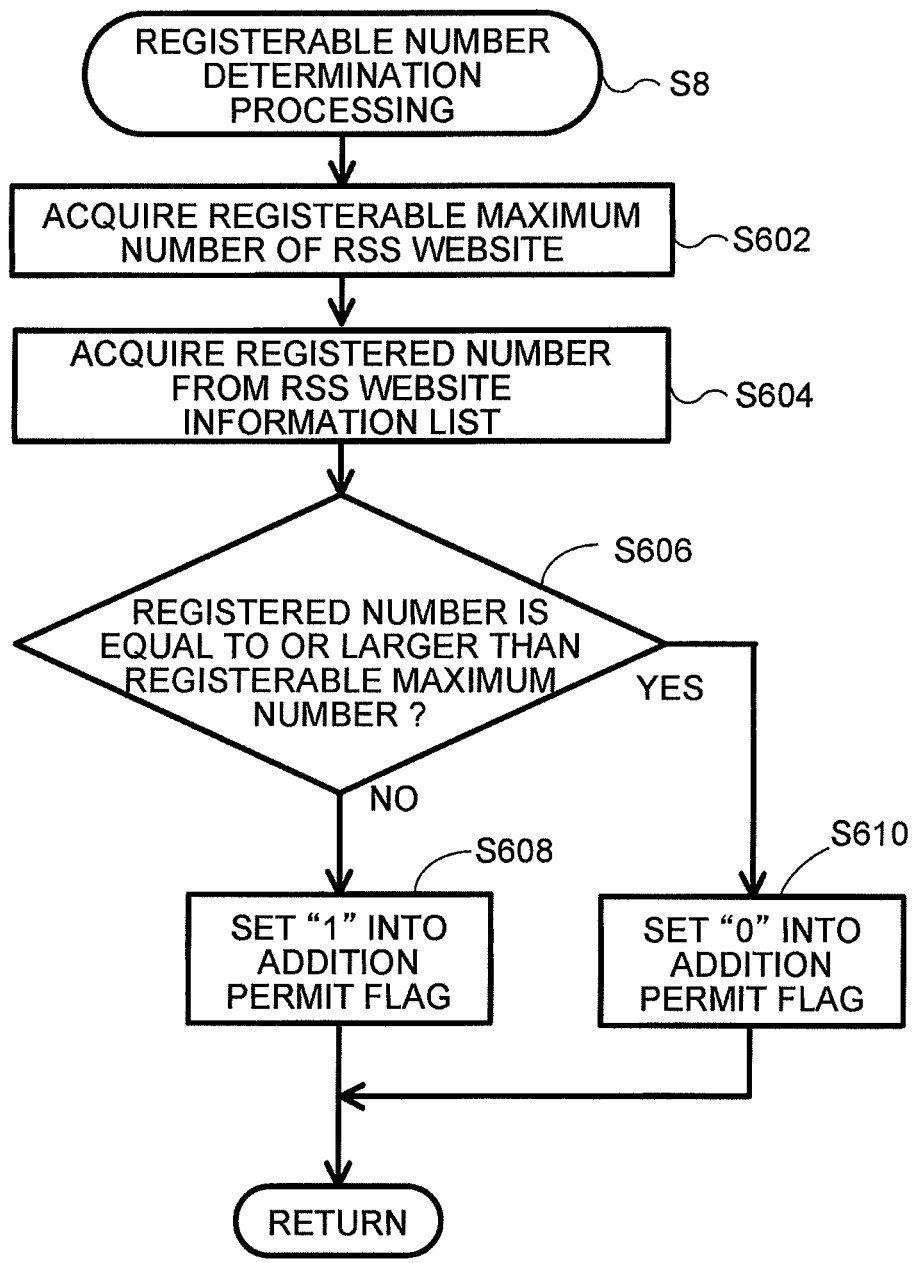
FIG. 6 is a flow chart showing device-side number-of-registered-entries determination processing executed by a PC.

FIG. 6 is a flow chart showing the device-side number-of-registered-entries determination processing (S8). The device-side number-of-registered-entries determination processing is performed in order to determine whether the specified external device has any vacancy for additional registration of RSS site information.

First, the "maximum number of registerable RSS site information pieces" received from the device in the processing at S510 shown in FIG. 5 is acquired (S602). Then, from the RSS site information list stored in the device registration information storage area 152 (see FIG. 2), the number of RSS site information pieces registered in the device (in a case that the device is the combined machine 40, the number of RSS site information pieces registered in the device-side RSS site information registration area 441) is acquired (S604).

Then, it is determined whether the number of RSS site information pieces registered in the device reaches the maximum number of registerable entries in the device (S606). When the determination result at S606 is negative (S606: No), "1" is stored into the addition permit flag 154 (see FIG. 2) (S608). Then, the procedure goes to the draw processing (S10) shown in FIG. 7. In contrast, when the determination result at S606 is positive (S606: Yes), "0" is stored into the addition permit flag 154 (S610). Then, the procedure goes to the draw processing (S10) shown in FIG. 7.

Figure 7:
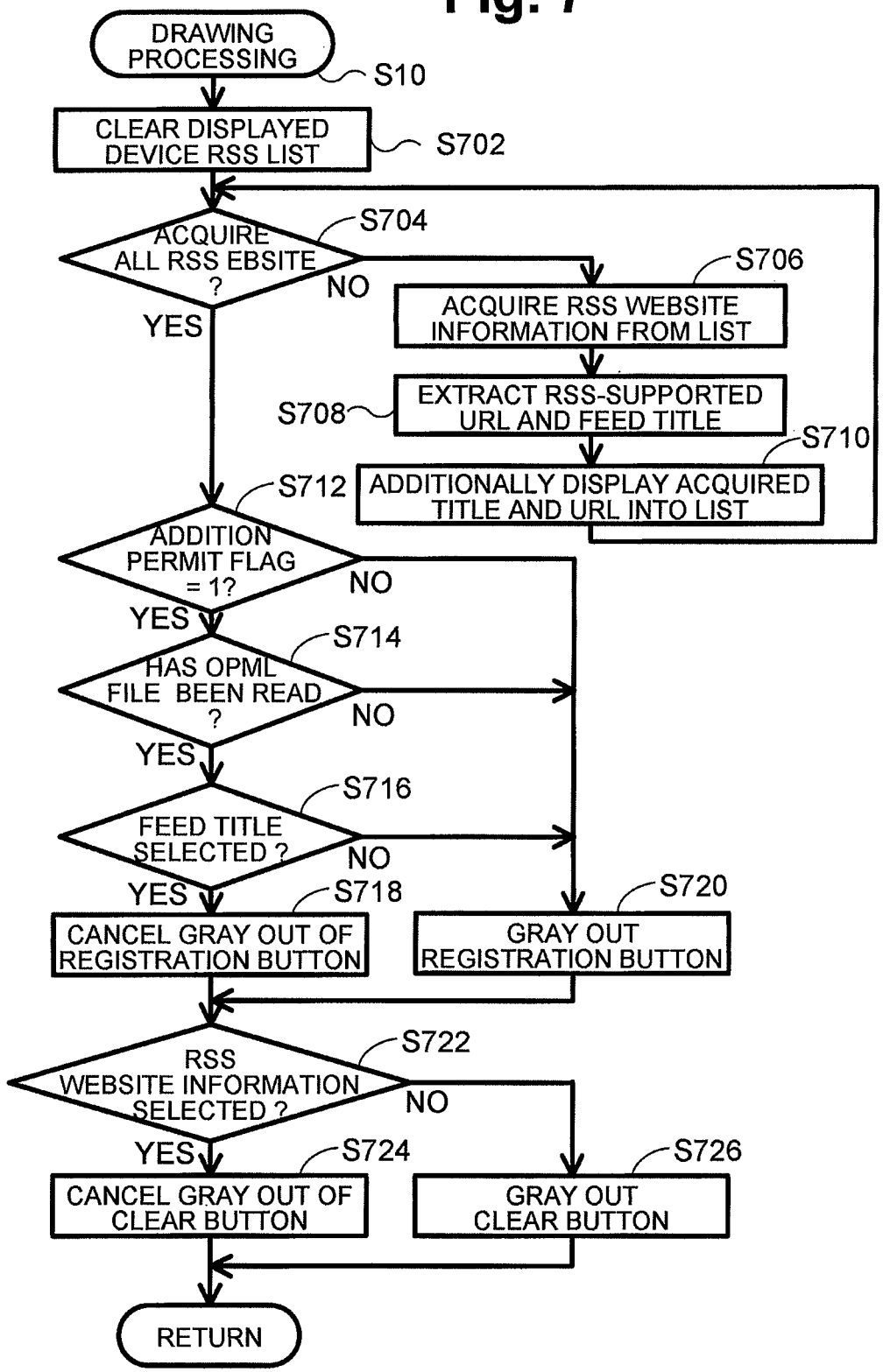
FIG. 7 is a flow chart showing draw processing executed by a PC.

FIG. 7 is a flow chart showing the draw processing (S10). First, the device RSS list 61 (see FIG. 3) displayed on the RSS list setting screen 60 is cleared (S702). Then, it is determined whether the entire RSS site information has been acquired from the RSS site information list stored in the device registration information storage area 152 (see FIG. 2) (S704). The determination result at S704 is negative at first (S704: No). Thus, then, the RSS site information in the RSS site information list is acquired (S706), and then an RSS-supported URL and a feed title from the acquired RSS site information are extracted (S708). Then, the RSS-supported URL and the feed title thus extracted RSS site information are additionally displayed on the device RSS list 61 (S710). Then, the procedure returns to the processing at S704.

In the course of repeating the processing described above, when the determination result at S704 becomes positive (S704: Yes), then, it is determined whether the addition permit flag 154 (see FIG. 2) is "1" (S712). When the determination result at S712 is negative (S712: No), the registration button 65 is grayed out (S720). According to this approach, inhibition of specifying RSS site information by user operation can be reported. Thus, a situation can be avoided that despite that as a result of careful consideration, the user has specified particular RSS site information to be additionally registered, additional registration of the specified RSS site information is not achieved.

In contrast, when the determination result at S712 is positive (S712: Yes), then, it is determined whether an OPML file has been read (S714). When the determination result at S714 is positive (S714: Yes), then, it is determined whether a feed title has been selected in the selection list 62 (S716). When the determination result at S716 is positive (S716: Yes), the grayed-out state of the registration button 65 is cancelled (S718). In contrast, when any one of the determination results at S714 and S716 is negative (S714 or S716: No), the procedure goes to S720 so that the registration button 65 is grayed out.

Then, it is determined whether particular RSS site information displayed in the device RSS list 61 (see FIG. 3) on the RSS list setting screen 60 has been selected (S722). When the determination result at S722 is positive (S722: Yes), the grayed-out state of the clear button 68 is cancelled (S724). In contrast, when the determination result at S722 is negative (S722: No), the clear button 68 is grayed out (S726).

As a result of the draw processing (S10), when the RSS list setting screen 60 shown in FIG. 3 is displayed on the display device 18 of the PC 10, the procedure returns to the processing at S12 shown in FIG. 4A, so that the processing is repeated.

Here, the device-side number-of-registered-entries determination processing having been described with reference to FIG. 6 (S8) and the draw processing having been described with reference to FIG. 7 (S10) are executed at each time when RSS site information is additionally registered into the device in the registration processing (S22) or alternatively the RSS site information deletion processing (S28) is performed.

That is, at each time when RSS site information is additionally registered or deleted, it is determined whether the number of entries after the change reaches the maximum number of registerable entries. Then, when the maximum number of registerable entries is reached, the registration button 65 is grayed out (see FIG. 3) so that inhibition of specifying RSS site information is reported.

Thus, as long as the grayed-out state of the registration button 65 is being cancelled, the user can additionally register RSS site information repeatedly. Thus, during the course of repeating additional registration, the user needs not check the newest number of registered entries at each time by oneself.

Figure 8:
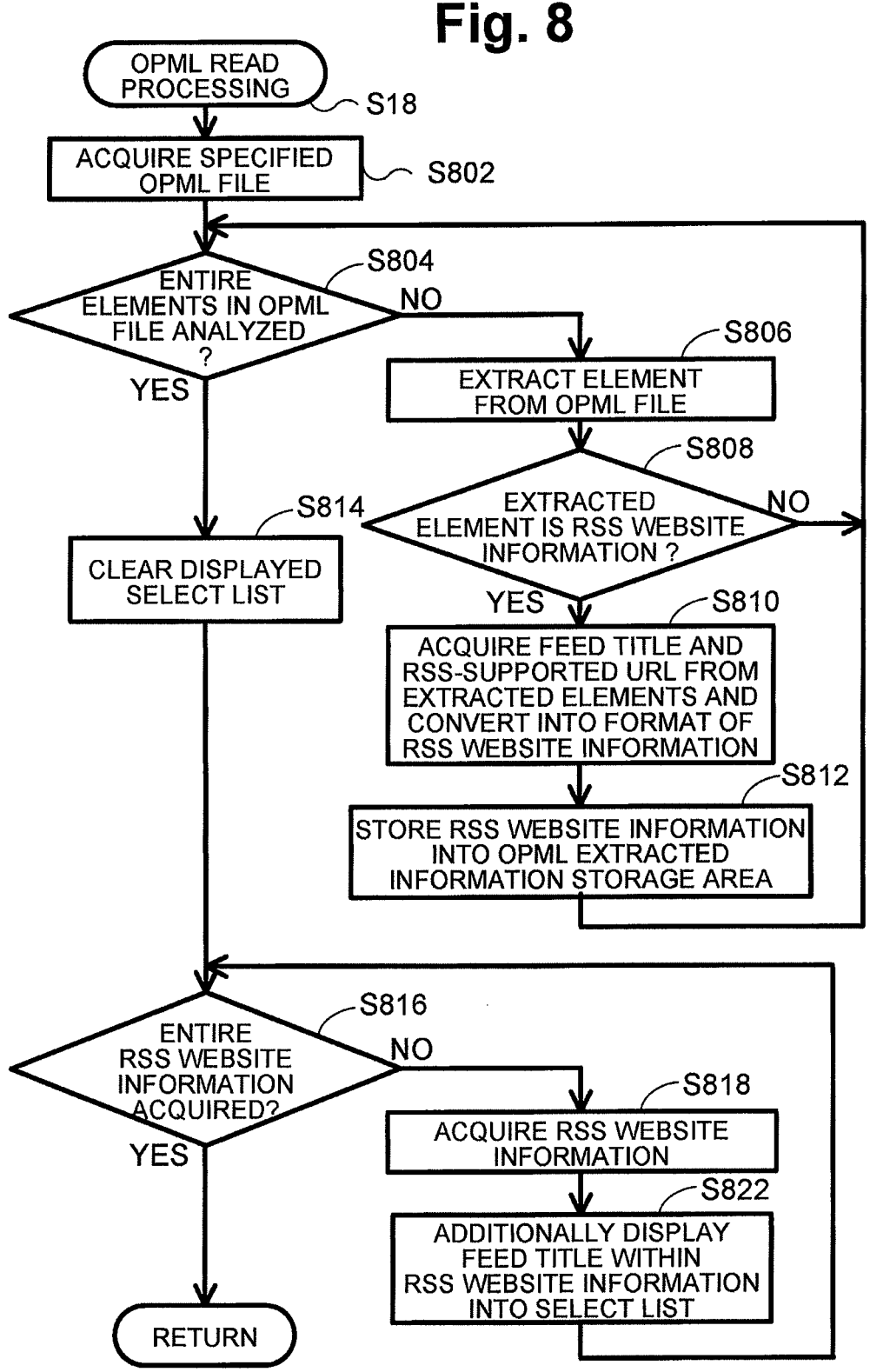
FIG. 8 is a flow chart showing OPML read processing executed by a PC.

FIG. 8 is a flow chart showing the OPML read processing (S18). The OPML read processing (S18) is executed when a read instruction for an OPML file is inputted and an OPML file to be read is specified by the user. Here, the following description is given for a case that an OPML file in which the RSS site information registered in the RSS site information registration area 142 is written is specified as the target of read. However, an OPML file generated by an apparatus other than the PC 10 or an OPML file generated by a program such as the web browser 144 other than the feed reader 141 may be adopted as the target of read in the present processing.

Figure 9:
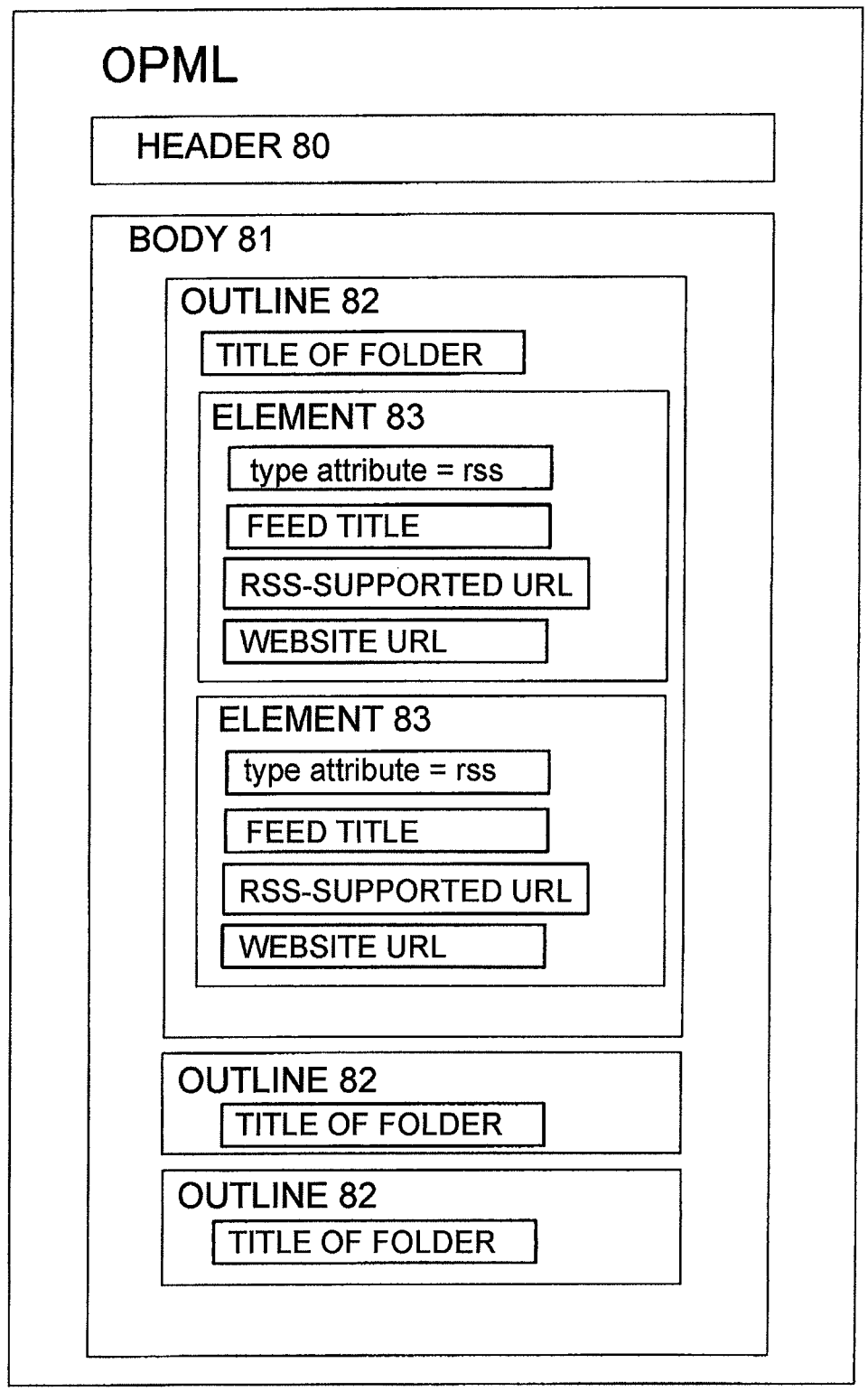
FIG. 9 is a diagram schematically showing a configuration of an OPML file.

Here, the configuration of the OPML file is described below with reference to FIG. 9. FIG. 9 is a diagram schematically showing the configuration of an OPML file. As shown in FIG. 9, the OPML file contains a header 80 and a body 81. The body 81 contains one or more outlines 82. Each outline 82 is a unit corresponding to a folder into which RSS site information or the like is grouped, and hence contains at least a text corresponding to the title (the folder name) of a folder.

Further, each outline 82 contains zero or more elements 83. As shown in FIG. 9, each element 83 is a unit in which the type attribute value, the feed title, the RSS-supported URL, and the website URL which is the URL of a website that distributes the feed are described collectively in a correspondence manner. When the type attribute value is "rss", it is determined that the element 83 is information containing an RSS-supported URL. By using such an OPML file, registered information can be transferred between RSS readers.

Here, in FIG. 9, the information pieces illustrated in each element 83 are not indispensable. That is, non-RSS-supported elements 83 not containing an RSS-supported URL and a feed title and RSS-supported elements 83 containing an RSS-supported URL may be mixed in an OPML file.

Description is continued with returning to FIG. 8. First, the OPML file specified by the user is acquired (S802). Then, it is determined whether the entire elements described in the OPML file have been analyzed (S804). The determination result at S804 is negative at first (S804: No). Thus, then, an element 83 (see FIG. 9) in the OPML file is extracted (S806), and then the type attribute value in the extracted element 83 is checked so that it is determined whether RSS site information is described in the element 83 (S808). When the determination result at S808 is negative (S808: No), the procedure returns to S804 so that the processing is repeated.

In contrast, when the determination result at S808 is positive (S808: Yes), then, on the basis of the feed title and the RSS-supported URL obtained after eliminating the type attribute value and the website URL from the extracted element 83, the data is converted into the format of RSS site information (S810), and then the converted data is stored into the OPML extraction information storage area 151 (see FIG. 2) (S812). Then, the procedure returns to S804 so that the processing is repeated. As such, as a result of repetition of the processing at S806 to S812, the OPML file is analyzed so that RSS site information alone is extracted from the information described in the OPML file.

Then, in the course of repeating the processing, the determination result at S804 becomes positive (S804: Yes), then, the displayed selection list 62 (see FIG. 3) is cleared (S814).

Then, it is determined whether the entire RSS site information has been acquired from the OPML file extraction information storage area 151 (see FIG. 2) (S816). The determination result at S816 is negative at first (S816: No). Thus, then, the RSS site information is acquired from the OPML extraction information storage area 151 (S818). Then, the feed title in the acquired RSS site information is additionally displayed in the selection list 62 (S822). Then, the procedure returns to S816 so that the processing is repeated. Here, when a folder that stores the acquired RSS site information is present, its folder name in place of the feed title may be read from the OPML file and then displayed. Then, in the course of repeating the processing, when the determination result at S816 becomes positive (S816: Yes), the OPML read processing (S18) is terminated. Then, the procedure returns to the processing at S4 shown in FIG. 4A.

According to the OPML read processing (S18), a feed title can be displayed for the RSS site information extracted as a result of the OPML file analysis. Thus, even when RSS-supported URLs and non-RSS-supported URLs are registered in a mixed manner in the registration unit serving as the source of the OPML file, RSS site information alone can be extracted and then browsed by the user.

FIG. 10 is a flow chart showing the registration processing (S22). The registration processing (S22) is the processing of additional registration of the RSS site information specified by user operation into the device-side RSS site information registration area 441 (see FIG. 2).

First, an RSS-supported URL contained in the RSS site information specified by user operation is acquired (S1002). Then, its RSS-supported URL is transmitted to the Internet 8 (S1004). Then, it is determined whether the RSS-supported URL has successfully been accessed (S1006). When the determination result at S1006 is negative (S1006: No), an inaccessibility message "Specified URL inaccessible. Registration desired?" is displayed (S1012). That is, inhibition of additional registration is reported. Then, it is determined whether the user selects "Yes" (S1014). When the determination result at S1014 is negative (S1014: No), the registration processing is terminated. Then, the procedure returns to the processing at S4 shown in FIG. 4A. In contrast, when the determination result at S1014 is positive (S1014: Yes), that is, when the user desires additional registration despite that the inaccessibility message is displayed, then, the procedure goes to the processing at S1016 for additionally registering the RSS site information.

In contrast, when the determination result at S1006 is positive (S1006: Yes), the data of access destination is acquired (S1008). Then, it is determined whether a feed of RSS format has successfully been acquired (S1010). That is, as for the RSS-supported URL specified by the user, the URL is once transmitted to the Internet 8, and then it is checked whether the data replied from the Internet 8 is acquirable by the feed reader 141. For example, when the data is a feed of Atom format or alternatively when the data has an RSS format but is unacquirable by the feed reader 141 because of version number difference, the determination result at S1010 is negative.

When the determination result at S1010 is positive (S1010: Yes), that is, when it is confirmed that a feed is acquirable, an RSS site information registration instruction in the form that the RSS-supported URL is attached is transmitted to the combined machine 40 (S1016). As a result of transmission of this instruction, the RSS site information can be additionally registered into the device-side RSS site information registration area 441 (see FIG. 2) of the combined machine 40. However, details of this are described later with reference to FIGS. 11A and 11B.

Then, a reply from the device is awaited (S1018). Then, it is determined whether the reply from the device is registration permission or, alternatively, exceeding number of to-be-registered entries (S1020). When the reply from the device is permission (S1020: registration permission), the registration processing is terminated (S22). Then, the procedure returns to the processing at S4 shown in FIG. 4A.

In contrast, when the reply from the device is exceeding number of to-be-registered entries (S1020: exceeding number of to-be-registered entries), a registration non-permission message "Number of to-be-registered entries exceeds" is displayed (S1024). Then, the registration processing is terminated (S22).

Further, when the determination result at S1010 is negative (S1010: No), that is, when it is not confirmed that a feed is acquirable, an incompatibility message "Site not compatible" is displayed (S1022). Then, inhibition of additional registration is reported, and then the registration processing is terminated (S22).

According to such registration processing (S22), as for RSS site information with which a feed of RSS format cannot be acquired, inhibition of additional registration can be reported. As a result, more useful RSS site information can be assigned into the remaining part of the maximum number of registerable entries in the device-side RSS site information registration area 441.

Further, the RSS site information to be registered into the device-side RSS site information registration area 441 is information consisting of the feed title and the RSS-supported URL obtained by eliminating the type attribute value and the website-corresponding URL from the element 83 (see FIG. 9) described in the OPML file. That is, ancillary information described in the OPML file is omitted so that the size of the information to be registered into the device-side RSS site information registration area 441 is reduced as much as possible. In particular, in a case that like in the combined machine 40, the feed reader 421 is installed but no web browser is installed and hence websites cannot be browsed, information containing website URLs and the like needs not be registered. Thus, the omission of ancillary information has a remarkable effect.

FIGS. 11A and 11B is a flow chart showing the registration information management processing (S1100) executed by the combined machine 40. The registration information management processing (S1100) is the processing of adding RSS site information to or, alternatively, deleting RSS site information from the device-side RSS site information registration area 441, and is executed after the startup of the combined machine 40.

First, the temporary storage area or the working area to be used in the registration information management processing (S1100) is initialized (S1102). Then, an instruction from the user or other apparatus is awaited (S1104).

Then, it is determined whether an RSS site information registration instruction has been received (S1108), when the determination result at S1108 is positive (S1108: Yes), then, the number of RSS site information pieces registered in the device-side RSS site information registration area 441 is acquired (S1110). Then, it is determined whether the number of registered RSS site information pieces reaches the maximum number of registerable entries in the device-side RSS site information registration area 441 (see FIG. 2) (S1112).

When the determination result at S1112 is positive (S1112: Yes), the RSS site information attached to the RSS site information registration instruction is registered into the device-side RSS site information registration area 441 (S1114). Then, a message "Registration permission" is notified to the transmission source of the RSS site information registration instruction (S1116), and then the procedure returns to the processing at S1104.

In contrast, when the determination result at S1112 is negative (S1112: No), a message "Number of to-be-registered entries exceeds" is notified to the transmission source of the RSS site information registration instruction (S1118), and then the procedure returns to the processing at S1104.

Here, when it determined on the PC 10 side that the number of RSS site information pieces registered in the combined machine 40 reaches the maximum number of registerable entries, the registration button 65 is grayed out by the PC 10. Thus, it is expected that the user does not try additional registration. Nevertheless, for example, in a case that two or more PCs simultaneously try additional registration of RSS site information into the combined machine

40, a state can arise that despite that the registration button 65 is not in a grayed-out state, the state of exceeding number of to-be-registered entries has occurred actually in the combined machine 40 and hence additional registration is not achieved. By virtue of this, in the present embodiment, whether additional registration has actually been successful is notified from the combined machine 40. According to this approach, the device of transmission source of the additional registration instruction can recognize a situation that additional registration cannot be achieved. Thus, the device of transmission source can perform appropriate processing such as displaying a registration non-permission message.

In contrast, when the determination result at S1108 is negative (S1108: No), then, it is determined whether an RSS site information deleting instruction has been received (S1120). When the determination result at S1120 is positive (S1120: Yes), it is determined whether the same URL as the RSS-supported URL attached to the "RSS site information deleting instruction" is registered in the device-side RSS site information registration area 441 (S1122).

When the determination result at S1122 is positive (S1122: Yes), the RSS site information containing the URL is deleted from the device-side RSS site information registration area 441 (S1124), and then the procedure returns to S1104. In contrast, when the determination result at S1122 is negative (S1122: No), S1124 is skipped, and then the procedure returns to S1104.

In contrast, when the determination result at S1120 is negative (S1120: No), then, it is determined whether an RSS site information acquisition instruction 125 has been received (S1126). When the determination result at S1126 is positive (S1126: Yes), the RSS site information list is acquired from the device-side RSS site information registration area 441 (S1130) while the maximum number of registerable RSS site information pieces is acquired from the maximum number storage area 442 (S1132). Then, these information pieces are transmitted to the device of transmission source of the RSS site information acquisition instruction (S1134), and then the procedure returns to the processing at S1104. Here, when the determination result at S1126 is negative (S1126: No), processing in accordance with other instruction is executed (S1128), and then the procedure returns to the processing at S1104.

According to the registration information management processing (S1100), in response to an instruction from other apparatus, the registered contents in the device-side RSS site information registration area 441 can be changed.

The invention has been described above with reference the embodiments. However, the invention is not limited to the embodiments described above. That is, various kinds of improvements and modifications may be performed without departing from the scope of the invention.

The embodiments have been given above in a case that the feed reader 141 or 421 acquires a feed of RSS format. However, for example, the format of feed is not limited to RSS. For example, the invention is applicable to a feed reader and a communication apparatus that can process a feed of other format such as the Atom format.

Further, the embodiments have been given above in a case that information described in the OPML file is additionally registered into the device-side RSS site information registration area 441. However, any file may be adopted in place of the OPML file according to the present embodiment, as long as the file can describe location information (URL) such as RSS site information used for acquiring a feed.

Further, in the embodiments given above, at each time that the registration processing was executed (S22), the procedure returned to the processing at S4 and then it was checked whether the number of RSS site information pieces registered on the device side had reached the upper limit. However, detailed examples of checking the number of registered entries are not restricted to this. For example, on the basis of the acquired number of RSS site information pieces, the remaining maximum number of registerable entries may be stored at first. Then, at each time when RSS site information is newly registered or deleted, the value may be incremented or decremented.

Further, in the embodiments given above, whether additional registration of RSS site information is achievable on the device side has been determined on the basis of the number of entries. However, it may be determined whether additional registration is achievable, on the basis of the capacity vacancy of the storage area for storing the registered RSS site information.

While the invention has been described in connection with embodiments, it will be understood by those skilled in the art that other variations and modifications of the embodiments described above may be made without departing from the scope of the invention. Other embodiments will be apparent to those skilled in the art from a consideration of the specification or practice of the invention disclosed herein. It is intended that the specification and the described examples are considered merely as exemplary of the invention, with the true scope of the invention being indicated by the flowing claims.

What is claimed is:
1. A communication system, comprising:
an information processing apparatus; and
a communication apparatus connected, via a network, to the information processing apparatus;
wherein the information processing apparatus comprises:
  a network communicating unit;
  a display;
  an instruction input device;
  a memory configured to store RSS site information comprising feed location information and a title of a feed to be acquired via the network in accordance with the feed location information; and
  a controller that performs processing to:
    acquire, via the network, feed location information and a title of a feed to be acquired in accordance with the feed location information registered in advance in the communication apparatus;
    extract a portion of the RSS site information stored in the memory, the portion of the RSS site information being one or both of the feed location information and the title of the feed to be acquired in accordance with the feed location information stored in the memory;
    control the display to display simultaneously the extracted portion of the RSS site information and at least one of the feed location information acquired from the communication apparatus and the title acquired from the communication apparatus; and
  transmit the extracted portion of the RSS site information into the communication apparatus via the network when the extracted portion of the RSS site information is selected via the instruction input device,
wherein the controller performs further processing to report an inhibition of selecting feed location information via the instruction input device when a number of feed location information registered in the communication apparatus reaches a registerable maximum number, and wherein the communication apparatus comprises:
another network communicating unit configured to communicate with the network,
another memory configured to store RSS site information comprising feed location information and a title of a feed to be acquired in accordance with the feed location information; and
another controller that performs processing to:
transmit, into the information processing apparatus via the network by way of the another network communicating unit, the RSS site information stored in the another memory, and
additionally register, into the another memory, the extracted portion of the RSS site information transmitted from the information processing apparatus via the network.

2. The communication system according to claim 1, wherein the controller of the information processing apparatus, before transmitting the extracted portion of the RSS site information to the communication apparatus, performs further processing to:
transmit, to the network, feed location information selected via the instruction input device or feed location information corresponding to a title selected via the instruction input device;
check whether a feed replied from the network is acquirable; and
report an inhibition of transmitting, into the communication apparatus, feed location information whose checked feed has not been acquirable.

3. The communication system according to claim 2, wherein the controller of the information processing apparatus, after reporting the inhibition of transmitting, performs further processing to stop transmitting the feed location information into the communication apparatus.

4. The communication system according to claim 1, wherein the controller of the information processing apparatus performs further processing to determine whether the number of feed location information registered in the communication apparatus after transmitting the extracted portion of the RSS site information reaches the registerable maximum number each time the controller of the information processing apparatus transmits feed location information into the communication apparatus via the network.

5. The communication system according to claim 1, wherein the RSS site information is an OPML (Outline Processor Markup Language) file and the controller of the information processing apparatus performs further processing to eliminate a value of a type attribute and the location information of a website relevant to a feed before transmitting the extracted portion of the RSS site information into the communication apparatus via the network.

6. The communication system according to claim 1, wherein the extracted portion of the RSS site information and at least one of the feed location information acquired from the communication apparatus and the title acquired from the communication apparatus are arranged side by side on the display.

7. A communication apparatus configured to be connected, via a network, to an information processing apparatus having a display and an input device, the communication apparatus, comprising:
a network communicating unit;
a memory configured to store RSS site information comprising feed location information and a title of a feed to be acquired in accordance with the feed location information; and
a controller that performs processing to:
extract a portion of the RSS site information stored in the memory, the portion of the RSS site information being one or both of the feed location information and the title of the feed to be acquired in accordance with the feed location information stored in the memory;
simultaneously display the extracted portion of the RSS site information on the display and at least one of the feed location information acquired from the communication apparatus and the title acquired from the communication apparatus;
transmit, into the information processing apparatus via the network, the extracted portion of the RSS site information and a maximum number of registerable RSS site information pieces when the extracted portion of the RSS site information is specified via input to the input device, and
additionally register, into the memory, feed location information transmitted from the information processing apparatus via the network,
wherein the controller performs further processing to report an inhibition of selecting feed location information via the instruction input device when a number of feed location information registered in the communication apparatus reaches a registerable maximum number.

8. The communication apparatus according to claim 7, wherein the controller performs further processing to transmit, into the information processing apparatus via the network, a message concerning an inhibition of registration when the number of feed location information registered in the memory reaches a registerable maximum number.

* * * * *